United States Patent
Hanaki et al.

(10) Patent No.: US 9,089,930 B2
(45) Date of Patent: Jul. 28, 2015

(54) SURFACE PROTECTION SHEET FOR LASER MATERIAL PROCESSING

(75) Inventors: Ikkou Hanaki, Ibaraki (JP); Keiji Hayashi, Ibaraki (JP); Kazuhito Okumura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 12/888,024

(22) Filed: Sep. 22, 2010

(65) Prior Publication Data
US 2011/0011841 A1    Jan. 20, 2011

Related U.S. Application Data

(62) Division of application No. 11/922,845, filed as application No. PCT/JP2006/313192 on Jun. 27, 2006, now abandoned.

(30) Foreign Application Priority Data

Jun. 27, 2005  (JP) .................................. 2005-187216

(51) Int. Cl.
*B23K 26/00* (2014.01)
*B23K 26/38* (2014.01)
(Continued)

(52) U.S. Cl.
CPC ................. *B23K 26/38* (2013.01); *B23K 26/18* (2013.01); *B23K 26/427* (2013.01); *B23K 37/06* (2013.01);
(Continued)

(58) Field of Classification Search
CPC ........ B23K 26/18; B23K 26/38; B23K 37/06; B23K 26/427

USPC ............ 219/121.72, 121.67, 121.85; 428/345
See application file for complete search history.

(56) References Cited

U.S. PATENT DOCUMENTS 5,059,256 A * 10/1991 Kanapenas et al. ...... 219/121.71
5,660,748 A *  8/1997 Tanaka et al. ............ 219/121.84
(Continued)

FOREIGN PATENT DOCUMENTS

EP          1 566 236          8/2005
EP          1 634 673          3/2006
(Continued)

OTHER PUBLICATIONS

International Search Report issued Aug. 29, 2006 in the International (PCT) Application No. PCT/JP2006/313192.
(Continued)

*Primary Examiner* — Thien S Tran
(74) *Attorney, Agent, or Firm* — Wenderoth, Lind & Ponack, L.L.P.

(57) ABSTRACT

The object of the present invention is provision of a surface protection sheet for laser processing to be applied to the surface on the opposite side of the laser beam irradiation face, which can protect the surface of an application object, and does not allow easy development of a dross during laser cutting processing. According to the present invention, a surface protection sheet 1 for laser processing to be applied to the surface on the opposite side of the laser beam irradiation face 2a of a workpiece 2 during a cutting process by irradiation of a laser beam 6 on the workpiece 2 is provided, which contains a substrate layer and an adhesive layer formed on one surface of the substrate layer, wherein the substrate layer is made of a resin material having a melt viscosity measured based on JIS K7199 (1999) at 290° C. of not more than 200 Pa·s, and has a thickness of 0.01-0.12 mm.

1 Claim, 2 Drawing Sheets

(51) Int. Cl.
*B23K 26/18* (2006.01)
*B23K 26/30* (2014.01)
*B23K 37/06* (2006.01)
*C09J 7/02* (2006.01)

(52) U.S. Cl.
CPC .............. *C09J 7/0271* (2013.01); *C09J 7/0285* (2013.01); *B23K 2203/04* (2013.01); *B23K 2203/10* (2013.01); *Y10T 428/266* (2015.01)

(56) References Cited

U.S. PATENT DOCUMENTS

| | | | | |
|---|---|---|---|---|
| 5,690,845 | A | * | 11/1997 | Fuse ........................ 219/121.74 |
| 5,837,965 | A | * | 11/1998 | Mosca et al. ............. 219/121.75 |
| 6,215,093 | B1 | * | 4/2001 | Meiners et al. .......... 219/121.61 |
| 6,899,949 | B2 | | 5/2005 | Imono et al. |
| 7,270,877 | B2 | | 9/2007 | Niino et al. |
| 2002/0023905 | A1 | * | 2/2002 | Fukaya et al. ........... 219/121.71 |
| 2002/0114948 | A1 | | 8/2002 | Schumann et al. |
| 2002/0166848 | A1 | * | 11/2002 | Furujo et al. ............. 219/121.71 |
| 2004/0028919 | A1 | | 2/2004 | Yamamoto et al. |
| 2004/0140300 | A1 | * | 7/2004 | Yoshikawa ............... 219/121.84 |
| 2004/0151903 | A1 | | 8/2004 | Niino et al. |
| 2005/0024743 | A1 | * | 2/2005 | Camy-Peyret ................ 359/719 |
| 2005/0185570 | A1 | | 8/2005 | Imono et al. |
| 2005/0242073 | A1 | * | 11/2005 | Nakamura et al. ....... 219/121.72 |
| 2006/0029798 | A1 | | 2/2006 | Yamamoto et al. |
| 2006/0065648 | A1 | * | 3/2006 | Kameyama et al. ..... 219/121.71 |
| 2006/0246279 | A1 | * | 11/2006 | Urairi et al. ................... 428/345 |
| 2008/0254249 | A1 | | 10/2008 | Hayashi et al. |

FOREIGN PATENT DOCUMENTS

| | | |
|---|---|---|
| EP | 1 714 730 | 10/2006 |
| JP | 60-213384 | 10/1985 |
| JP | 63-160781 | 7/1988 |
| JP | 2-295688 | 12/1990 |
| JP | 7-241688 | 9/1995 |
| JP | 08-162583 | 6/1996 |
| JP | 2000-328022 | 11/2000 |
| JP | 2001-212690 | 8/2001 |
| JP | 2002-1560 | 1/2002 |
| JP | 2002-302657 | 10/2002 |
| JP | 2002-343747 | 11/2002 |
| JP | 2004/096483 | 11/2004 |
| JP | 2004-322157 | 11/2004 |
| TW | 200501251 | 1/2005 |
| WO | 01/41968 | 6/2001 |
| WO | 2004/096483 | 11/2004 |
| WO | WO 2004096483 A1 * 11/2004 ............. B23K 26/18 |  |

OTHER PUBLICATIONS

Office Action issued Dec. 21, 2012 in corresponding Taiwanese Application No. 101-2(6)01212, with English translation.

* cited by examiner

FIG. 2
(A) (Prior Art)
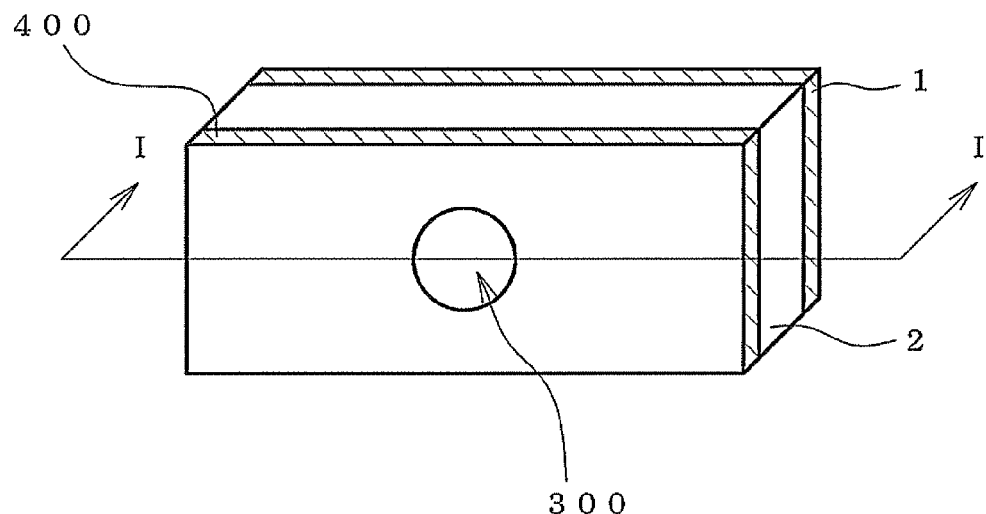
(B) (Prior Art)
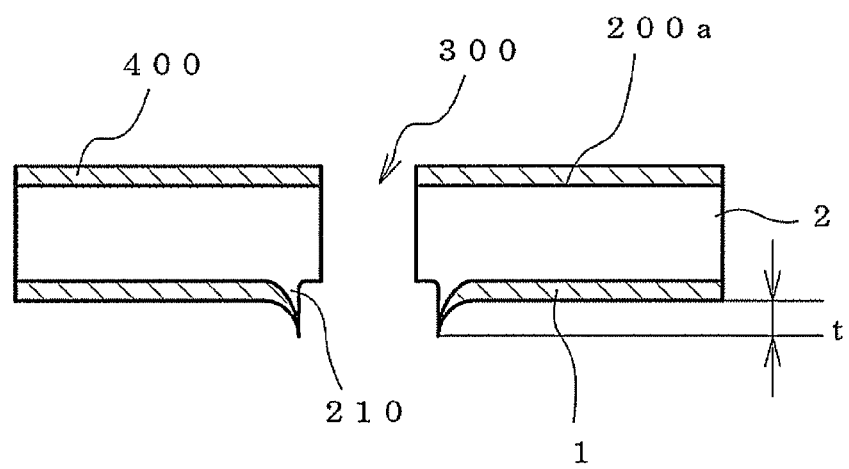

SURFACE PROTECTION SHEET FOR LASER MATERIAL PROCESSING

This application is a Divisional of application Ser. No. 11/922,845, filed Dec. 26, 2007, now abandoned which is the National Stage of International Application No. PCT/2006/313192, filed Jun. 27, 2006.

FIELD OF INVENTION

The present invention relates to a surface protection sheet for laser processing, which is applied to a workpiece subjected to a cutting process by irradiation of a laser beam.

BACKGROUND OF THE INVENTION

It is a conventional practice to apply a resin material sheet for protection of the surface of a member such as a metal plate, a coated metal plate, an aluminum sash, a resin board, a decorative copper plate, a vinyl chloride-laminated steel plate, a glass plate and the like during transportation, processing, covering and the like.

The property necessary for a surface protection sheet includes absence of detachment and delamination of a protection sheet after application to an application object and absence of a residual adhesive layer on the application object after release or removal. Furthermore, it includes absence of the development of detachment and delamination of a surface protection sheet, damage, and adhesive residue on an application object and the like, after processing of the application object with the surface protection sheet applied thereto. For example, JP-A-2000-328022 and JP-A-2002-302657 disclose a surface protection sheet for a metal plate.

Of the processing methods for a plate member and the like, laser cutting processing has superior merits. The merits are, unlike punching processing, it does not require various dies but merely requires an input of the design data for practicing, it requires a shorter time than punching processing when a processing target (hereinafter to be also referred to as a workpiece) is particularly a metal plate, it is applicable even when the workpiece is thick, and it does not require a lubricant. Accordingly, the market of the laser cutting processing tends to expand. However, laser cutting processing requires a high-pressure (about 0.5-1.5 MPa) assist gas supply.

In some cases, a workpiece is desirably subjected to laser cutting processing with a surface protection sheet applied thereon for appearance reasons and the like. In such a case, there is a problem of undesired delamination of the surface protection sheet from the workpiece due to the influence of the assist gas. To solve such problem, JP-A-2-295688, JP-A-7-241688 and JP-A-2001-212690 propose laser cutting processing methods capable of suppressing delamination during laser cutting processing. These processing methods can suppress delamination of a protection sheet.

SUMMARY OF THE INVENTION

However, all the methods disclosed in the above-mentioned prior art references have a problem of delamination of a surface protection sheet on the surface of a workpiece, on which a laser beam is irradiated. The cause thereof is considered to be expression of the influence of the assist gas only on the surface on which a laser beam is irradiated. However, application of a surface protection sheet on the opposite side of the surface of a workpiece, on which a laser beam is irradiated, has not been practiced. The present inventors actually performed laser cutting processing with a surface protection sheet of the above-mentioned prior art references applied on the opposite side of the surface of a workpiece, on which a laser beam is irradiated, and found that a new problem occurs which has not been found at all when the laser cutting processing was performed without application of a surface protection sheet. Specifically, a burr (dross) is developed in the vicinity of the cut part. FIG. 2 is an explanation figure of the dross. FIG. 2 (A) is a plane view wherein a cylindrical through-hole 300 is formed by laser cutting processing. In the laser cutting processing tried by the present inventors, a laser beam was irradiated on a surface 200a on the opposite side of the surface of workpiece 2, on which a surface protection sheet 1 is applied. FIG. 2 (B) is a sectional view along I-I of FIG. 2 (A), wherein a dross 210 with a height t is developed on the surface on the opposite side of surface 200a on which a laser beam was irradiated. Once such dross 210 is developed, unpreferably, a further step to remove the dross becomes necessary. Moreover, since the surface to be in contact with surface protection sheet 1 during laser cutting processing of workpiece 2 is mostly a sharp-surfaced table, and without the surface protection sheet 1, a workpiece itself may be damaged during setting thereon.

The present invention aims at provision of a surface protection sheet for laser processing to be applied to the surface on the opposite side of the laser beam irradiation face, which can protect the surface of an application object, which is the original role of a protection sheet, and does not allow easy development of a dross during laser cutting processing.

The present inventors have found that a surface protection sheet applied to the surface on the opposite side of the laser beam irradiation surface prevents the melt of a workpiece from being easily blown off by an assist gas during laser cutting processing, which consequently facilitates development of a dross. Based thereon, they have found a surface protection sheet for laser processing, which does not suffer easily from such a problem. The characteristics of the present invention are as follows.

(1) A surface protection sheet for laser processing to be applied to the surface on the opposite side of the laser beam irradiation face of a workpiece during a cutting process by irradiation of a laser beam on the workpiece, which comprises a substrate layer and an adhesive layer formed on one surface of the substrate layer, wherein the substrate layer is made of a resin material having a melt viscosity measured based on JIS K7199 (1999) at 290° C. of not more than 200 Pa·s, and has a thickness of 0.01-0.12 mm.
(2) The surface protection sheet of (1), wherein the resin material comprises a polyester-based resin.
(3) The surface protection sheet of (2), wherein the polyester-based resin is a poly(ethylene terephthalate) resin.
(4) The surface protection sheet of (1), wherein the resin material comprises a polyolefin-based resin.
(5) The surface protection sheet of any of (1) to (4), wherein the workpiece is a metal plate.
(6) The surface protection sheet of (5), wherein the metal plate is a stainless plate.
(7) The surface protection sheet of (5), wherein the metal plate is an aluminum plate.

With the surface protection sheet for laser processing of the present invention, a dross is not developed easily during a laser cutting processing. Therefore, it is possible to subject a workpiece, particularly a metal plate and the like, to a laser cutting processing with a damage protection on the surface on the opposite side of a laser irradiation face. In one embodiment of the present invention, by setting, on a surface (200a side in FIG. 2(B)), on which a laser beam is irradiated, a surface protection sheet associated with less delamination due to an assist gas (400 in FIG. 2(B)), conventionally unavailable laser cutting processing of a workpiece having the sheet on both surfaces thereof can be enabled.

BRIEF DESCRIPTION OF THE DRAWINGS

FIG. 2 is an explanation figure of a dross developed by a laser cutting processing.

Figure 1:
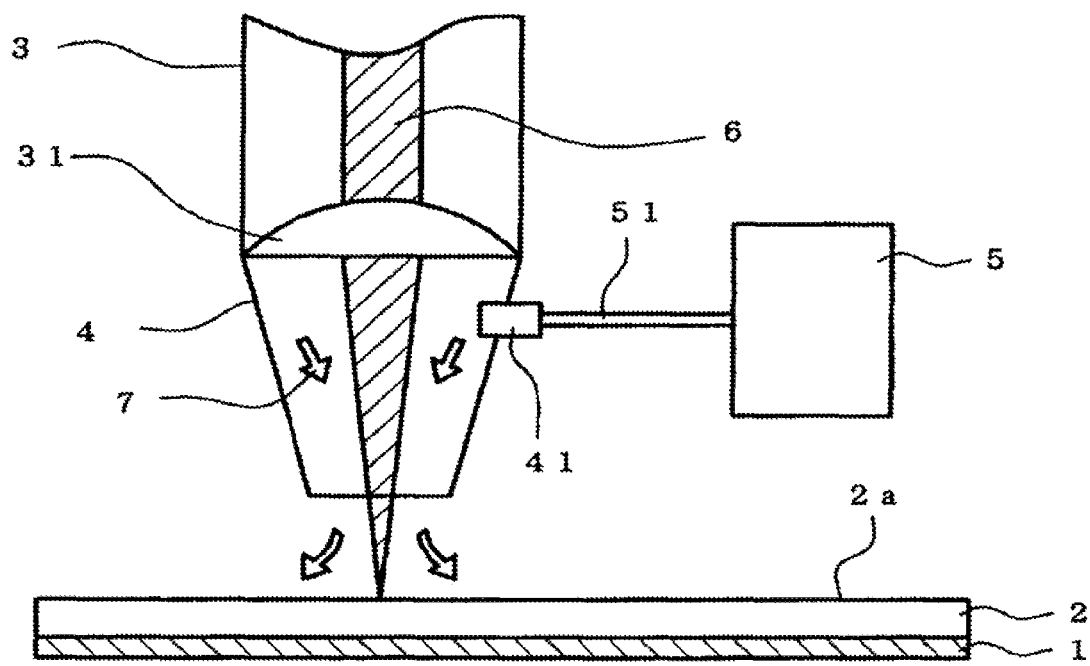
FIG. 1 schematically shows use of the surface protection sheet for laser processing of the present invention.

The symbols in the drawings are as follows. 1 surface protection sheet for laser processing, 2 workpiece, 3 processing head, 31 collective lens, 4 nozzle, 41 gas inlet, 5 gas supply means, 51 inlet tube, 6 laser beam, 7 assist gas, 1 surface protection sheet, 2 workpiece, 210 dross, 300 through-hole.

DETAILED DESCRIPTION OF THE INVENTION

The surface protection sheet for laser processing of the present invention comprises a substrate layer and an adhesive layer. The substrate layer is made of a resin material having a particular melt viscosity, and has a thickness within a particular range. The adhesive layer can be formed on one surface of the substrate layer.

The melt viscosity of the resin material constituting the substrate layer is measured based on JIS K7199 (1999). More specifically, a measurement sample is obtained as shown in the following, and the melt viscosity is obtained using a capillary die at 290° C., and via the measurement of test pressure and volume flow rate. A specific method for obtaining the measurement sample is as follows.

When the resin material constituting the substrate layer is clear, the resin material is palletized to give a measurement sample.

When the adhesive layer and the substrate layer can be separated, the adhesive layer is removed using an organic solvent and the like, and only the substrate layer is finely cut to give a measurement sample.

When the adhesive layer and the substrate layer cannot be separated easily, the whole surface protection sheet is finely cut to give a measurement sample, and the melt viscosity obtained by measuring the measurement sample is taken as the melt viscosity of the resin material constituting the substrate layer.

When the substrate layer has a multi-layer structure, the whole substrate layer is finely cut to give a measurement sample.

In the present invention, a resin material having a melt viscosity measured as mentioned above of not more than 200 Pa·s, preferably not more than 150 Pa·s, more preferably 20-100 Pa·s, is used as a material of the substrate layer. When the melt viscosity exceeds 200 Pa·s, the substrate layer is not easily blown off in a laser-cut part and, as a result, a dross is easily developed. When the melt viscosity is within the above-mentioned preferable range, a dross is more easily blown off with an assist gas, and the film forming becomes more easy.

A resin material having a melt viscosity measured at 290° C. of not more than 200 Pa·s typically comprises a polyester-based resin. Of these, poly(ethylene terephthalate), poly(butylene terephthalate), poly(ethylene naphthalate), poly(trimethylene terephthalate), poly(lactic acid), polycarbonate and the like can be mentioned. In addition, amide-based polymers such as 6-nylon, 6,6-nylon, 12-nylon and the like; styrene-based polymers such as HIPS, GPPS and the like; acrylic-based polymers such as poly(methyl methacrylate) and the like; polyolefin-based resins such as propylene-based polymer, ethylene-based polymer, ethylene-based copolymerized polymer and the like; and the like can be mentioned. As propylene-based polymers, homopolymer series, block polymer series, random polymer series and the like can be mentioned. As the ethylene-based polymer, low density, high density, linear low density polymers and the like can be mentioned. As the ethylene-based copolymerized polymer, copolymers of ethylene and a polar polymer such as vinyl acetate, methyl methacrylate, acrylic acid and the like, and the like can be mentioned. One kind alone of these polymers or two or more kinds thereof, which are optionally mixed, may be used as a resin material. The melt viscosity of the resins recited above is not necessarily within the above-mentioned range, and a resin usable in the present invention can be found easily from these resins by the measurement defined in the JIS. In addition, the substrate layer may be made to have a multi-layer structure and the like.

The substrate layer may contain, within the range that does not impair the effect of the present invention, appropriate additives such as a filler (e.g., calcium carbonate, talc, calcium oxide and the like), an antiblocking agent, a lubricant, titanium oxide, an organic and inorganic pigment aiming at coloring, an antioxidant aiming at prevention of degradation and the like, a UV absorber, a light stabilizer, an antistatic agent and the like. Furthermore, a plasticizer and the like for improving the flexibility of a substrate layer can also be added. In addition, a surface treatment such as a corona treatment and the like may be applied to a substrate surface for the purpose of improving the adhesion with a back treating agent, an adhesive and an undercoating agent. To prevent a dross and ensure the action as a protection sheet, the lower limit of the thickness of the substrate layer is 0.01 mm, preferably 0.02 mm. The upper limit of the thickness of the substrate layer is 0.12 mm, preferably 0.10 mm, more preferably 0.05 mm.

The adhesive layer is now explained.

An adhesive layer is formed on one surface of the substrate layer. The adhesive layer only needs to have adhesiveness to a stainless plate, which is a typical workpiece. As an adhesive as a material of the adhesive layer, known rubber-based adhesives, acrylic-based adhesives, polyester-based adhesives and polyurethane-based adhesives can be used. Of these, from the aspects of adhesiveness to a metal plate, release property and cost, rubber-based adhesives and acrylic adhesives are preferable. An adhesive layer using such adhesive is preferable because it also has adhesiveness to a metal plate and a glass plate other than a stainless plate.

As a rubber-based adhesive, for example, natural rubber-based adhesives, synthetic rubber-based adhesives and the like can be mentioned. As the synthetic rubber-based adhesive, styrene-based elastomers such as polybutadiene, polyisoprene, butyl rubber, polyisobutylene, styrene-butadiene-styrene block copolymer and the like, styrene-based elastomers such as styrene-ethylene-butylene-styrene block copolymer, styrene-ethylene-butylene random copolymer and the like, ethylene-propylene rubber, propylene-butene rubber, ethylene-propylene-butene rubber and the like are used as a main component.

As an acrylic-based adhesive, for example, a copolymer of a monomer mixture of alkyl(meth)acrylate such as butyl (meth)acrylate, 2-ethylhexyl(meth)acrylate and the like as a main component and, where necessary, as a copolymerizable monomer for modification, other monomers such as hydroxyl group containing monomer (e.g., 2-hydroxyethyl(meth)acrylate and the like), carboxyl group containing monomer (e.g., (meth)acrylic acid and the like), styrene-based monomer (e.g., styrene and the like), vinyl esters (e.g., vinyl acetate and the like), and the like is used. The acrylic-based adhesive can be obtained by a conventionally used polymerization method such as solution polymerization method, emulsion polymerization method, UV polymerization method and the like.

Where necessary, for the purpose of controlling the adhesive property of these adhesives and the like, for example, a crosslinking agent, a tackifier, a softening agent, an olefin-based resin, a silicone-based polymer, a liquid acrylic-based copolymer, a phosphoric acid ester series compound, an anti-aging agent, a light stabilizer such as a hindered amine series light stabilizer and the like, a UV absorber and others such as appropriate additives, for example, a filler, a pigment and the like such as calcium oxide, magnesium oxide, calcium carbonate, silica, zinc oxide and titanium oxide may be added.

Addition of a tackifier is effective for improving adhesiveness, and the amount of addition thereof is preferably 0-50 parts by weight, especially 0-30 parts by weight, particularly 0-10 parts by weight, per 100 parts by weight of the aforementioned adhesive, to improve adhesion to avoid development of a problem of an adhesive residue due to decreased cohesion and the like. As used herein, 0 part by weight means no addition of a tackifier.

As a tackifier, for example, one or more kinds of known appropriate adhesives such as petroleum-based resins (e.g., aliphatic series, aromatic series, aliphatic-aromatic copolymer series, alicyclic series and the like), coumarone-indene-based resin, terpene-based resin, terpene-phenol-based resin, polymerized rosin-based resin, (alkyl) phenol-based resin, xylene-based resin, hydrogenated series resins thereof and the like can be used.

Addition of a softening agent is generally effective for improving adhesiveness. As the softening agent, for example, one or more kinds of low molecular weight diene-based polymer, polyisobutylene, hydrogenated polyisoprene, hydrogenated polybutadiene and derivatives thereof can be used, and the amount of addition thereof can be appropriately determined. Particularly, 0-40 parts by weight, especially 0-20 parts by weight, particularly 0-10 parts by weight, per 100 parts by weight of the above-described adhesive is preferable. As used herein, 0 part by weight means no addition of a softening agent. When the amount to be added is not more than 40 parts by weight, adhesive residue is less even at a high temperature or under outdoor exposure and the like.

The thickness of an adhesive layer can be appropriately determined according to adhesiveness and the like. Generally, it is set to 0.001-0.050 mm, especially 0.002-0.020 mm, particularly 0.003-0.015 mm. Where necessary, the adhesive layer can also be protected by temporarily setting a separator and the like until practical use.

A surface protection sheet for laser processing can be formed, for example, according to a known adhesion sheet formation method such as a method including applying a solution obtained by dissolving an adhesive composition in a solvent or a liquid melt resulting from heating the composition to a substrate layer, a method including forming an adhesive layer on a separator and shifting and adhering the adhesive layer to a substrate layer, a method including extruding and forming a material for forming an adhesive layer on a substrate layer to coat the substrate layer, a method including coextruding a substrate layer and an adhesive layer in two layers or multiple layers, a method including laminating a single layer of an adhesive layer or two layers of a laminate layer and an adhesive layer on a substrate layer, a method including laminating two layers or multiple layers of an adhesive layer, and a substrate layer, or a laminate layer and the like, and the like.

The surface protection sheet for laser processing of the present invention may have a release layer. As a back treating agent for forming a release layer, one made of a solvent type or non-solvent type silicone-based polymer or a long chain alkyl-based polymer is generally used. Specifically, Peeloil (manufactured by Ipposha Yushi Kogyo Co., Ltd.), Shin-Etsu Silicones (manufactured by Shin-Etsu Chemical Co., Ltd.) and the like are available. As a method for forming a release layer, for example, a known coating method such as a coating method using a roll coater (e.g., a gravure roll and the like), an atomizing method by a spray and the like, and the like can be used.

The use of the surface protection sheet for laser processing of the present invention is explained in the following.

FIG. 1 schematically shows the use of the surface protection sheet for laser processing of the present invention. The surface protection sheet 1 for laser processing of the present invention is adhered to a workpiece 2 to be subjected to a cutting process, by irradiation of laser beam 6. In the apparatus shown in this Figure, a laser beam 6 is focused by a collective lens 31 of a processing head 3 and then irradiated on the workpiece 2 from a nozzle 4. However, in the present invention, a laser beam generation apparatus is not limited to the one shown in the Figure. An assist gas 7 is blown against the workpiece 2 at a high pressure of about 0.5-1.5 MPa from the nozzle 4 together with the laser beam 6. The assist gas 7 is supplied via an inlet tube 51 and a gas inlet 41 from a gas supply means 5 such as a gas cylinder and the like. For the assist gas 7, various gases can be used as appropriate according to the material of workpiece 2 and the required quality of cut surface. Typically, nitrogen gas, air and the like are used.

The workpiece 2 is a target to be cut, which is exemplified by a metal plate, a coated metal plate, an aluminum sash, a resin board, a decorative copper plate, a vinyl chloride-laminated steel plate, a glass plate and the like. The effect of the present invention becomes particularly remarkable in the case of a metal plate on which a dross is easily developed and which is required to have excellent appearance, particularly, a stainless plate and an aluminum plate.

The cutting process by irradiation of a laser beam 6 includes irradiation of a laser beam 6 from one side of a workpiece 2 to form a cut section penetrating through to the opposite side of the irradiation side, thereby to release at least one part of the workpiece. As shown in FIG. 2, it may be a processing to remove a cylindrical part, or a processing to divide a large workpiece into plural small pieces. The surface protection sheet 1 for laser processing of the present invention is to be adhered to the surface on the opposite side of a laser beam irradiation face 2a of a workpiece 2 (processing target) in the cutting process. In other words, the cutting process is performed by irradiating laser beam 6 to the surface 2a on the opposite side of the applied surface of workpiece 2 with the surface protection sheet 1 for laser processing of the present invention applied to the workpiece 2. The surface protection sheet 1 for laser processing of the present invention is applied to the surface on the opposite side of the laser beam irradiation face 2a of the workpiece 2, at least to the part to be cut by the cutting process. In workpiece 2, the surface, on which the surface protection sheet for laser processing of the present invention is applied, can avoid damage caused by mounting on a laser processing apparatus and the like, and moreover, does not develop a dross easily.

EXAMPLES

The present invention is explained in more detail in the following by referring to Examples, which are not to be construed as limitative.

Example 1

An isocyanate series crosslinking agent (3 parts by weight, CORONATE L manufactured by NIPPON POLYURETHANE INDUSTRY CO., LTD.) was added to an ethyl acetate solution containing an acrylic-based adhesive (100 parts by weight, weight average molecular weight based on polystyrene 600,000) containing 2-ethylhexyl acrylate (2EHA, 30 wt %), ethyl acrylate (EA, 60%), methyl methacrylate (MMA, 6 wt %) and 2-hydroxyethyl acrylate (HEA, 4 wt %) to give an acrylic-based adhesive solution.

A 0.038 mm-thick poly(ethylene terephthalate) film (Tetoron Film G2 manufactured by Teijin DuPont Films Japan Limited) was directly used as a substrate layer. A resin material sampled from the substrate layer had a melt viscosity at 290° C. of 74 Pa·s.

The acrylic-based adhesive solution was applied to the aforementioned substrate layer and dried to form a 0.010 mm-thick adhesive layer, whereby a surface protection sheet for laser processing was obtained.

Example 2

Poly(butylene terephthalate) (DURANEX 200FP manufactured by WinTech Polymer Ltd.) was formed into a film at a die temperature of 250° C. by a T-die method to give a 0.04 mm-thick substrate layer. A resin material sampled from the substrate layer had a melt viscosity at 290° C. of 26 Pa·s.

The acrylic-based adhesive solution used in Example 1 was applied to this substrate layer and dried to form a 0.005 mm-thick adhesive layer, whereby a surface protection sheet for laser processing was obtained.

Example 3

In the same manner as in Example 1 except that a 0.05-mm thick poly(ethylene terephthalate) film (Tetoron Film G2 manufactured by Teijin DuPont Films Japan Limited) was used as a substrate layer, a surface protection sheet for laser processing was obtained.

Example 4

Low density polyethylene (MIRASON 68P manufactured by Mitsui Chemicals, Inc.) was used as a material of a substrate layer and a mixture of a styrene-ethylene-butylene-styrene block copolymer (Tuftec H1062 manufactured by Asahi Kasei Corporation, 100 parts by weight) and a hydrogenated petroleum resin (ARKON P-100 manufactured by Arakawa Chemical Industries, Ltd., 50 parts by weight) was used as a material of an adhesive layer. These were coextruded by a T-die method at a die temperature of 170° C. to give a surface protection sheet for laser processing having a 0.01 mm-thick adhesive layer formed on a 0.05 mm-thick substrate layer. A resin material sampled from the above-mentioned substrate layer had a melt viscosity at 290° C. of 47 Pa·s.

Example 5

In the same manner as in Example 1 except that the thickness of an adhesive layer was set to 5 μm, a surface protection sheet for laser processing was obtained.

Comparative Example 1

Low density polyethylene (SUMIKATHENE F208 manufactured by Sumitomo Chemical Co., Ltd.) was formed into a film at a die temperature of 160° C. by an inflation method to give a 0.11 mm-thick substrate layer. A resin material sampled from the substrate layer had a melt viscosity at 290° C. of 285 Pa·s.

One surface of the substrate layer was subjected to a corona discharge treatment and the acrylic-based adhesive solution used in Example 1 was applied to the treated surface and dried to form a 0.010 mm-thick adhesive layer, whereby a surface protection sheet for laser processing was obtained.

Comparative Example 2

In the same manner as in Comparative Example 1 except that the thickness of the substrate layer was set to 0.06 mm, a surface protection sheet for laser processing was obtained.

Comparative Example 3

In the same manner as in Example 1 except that a 0.125-mm thick poly(ethylene terephthalate) film (Tetoron Film G2 manufactured by Teijin DuPont Films Japan Limited) was used as a substrate layer, a surface protection sheet for laser processing was obtained. A resin material sampled from the substrate layer had a melt viscosity at 290° C. of 74 Pa·s as in Example 1.

Comparative Example 4

Polypropylene (Novatech PP FL6H manufactured by Japan Polypropylene Corporation) was formed into a film at a die temperature of 230° C. by a T-die method to give a 0.04 mm-thick substrate layer. A resin material sampled from the substrate layer had a melt viscosity at 290° C. of 422 Pa·s.

One surface of the substrate layer was subjected to a corona discharge treatment and the acrylic-based adhesive solution used in Example 1 was applied to the treated surface and dried to form a 0.010 mm-thick adhesive layer, whereby a surface protection sheet for laser processing was obtained.

Comparative Example 5

Poly(butylene terephthalate) (DURANEX 800FP manufactured by WinTech Polymer Ltd.) was formed into a film at a die temperature of 270° C. by a T-die method to give a 0.04 mm-thick substrate layer. A resin material sampled from the substrate layer had a melt viscosity at 290° C. of 295 Pa·s.

The acrylic-based adhesive solution used in Example 1 was applied to one surface of the substrate layer and dried to form a 0.005 mm-thick adhesive layer, whereby a surface protection sheet for laser processing was obtained.

(Measurement of Melt Viscosity)

The melt viscosity was measured by the aforementioned method. Specifically, a capillary rheometer (Capirograph 1B manufactured by Toyo Seiki Seisaku-sho, Ltd.) described in JIS K7199 was used and the measurement was performed at a nozzle diameter D of 1.0 mm, a land length L of 30 mm, and a shear rate of 10 $\sec^{-1}$.

(Laser Cutting Processing Conditions)

A carbon dioxide gas laser processing machine (LC-3015θII manufactured by AMADA CO., LTD.) and an oscillator (OLC-420HII manufactured by AMADA CO., LTD.) were used and a linear cutting process was performed at cutting rate 2200 mm/min, output 3000 W, frequency 0 Hz, duty 100, nitrogen gas pressure 0.85 MPa, nozzle diameter 2.0 mm, nozzle gap 0.3 mm, and laser beam focus at 1.0 mm below the upper surface of a workpiece (metal plate).

(Laser Cutting Processing Test)

Using a 2.0 mm-thick SUS304 (2B finishing) as a workpiece, a surface protection sheet for laser processing obtained in each Example or Comparative Example was applied to one surface thereof. A cutting process test was performed by irradiating a laser beam to a surface on the opposite side of the surface applied with the aforementioned sheet, under the aforementioned conditions.

After the test, the height of the dross developed on the surface applied with the aforementioned sheet was measured. The difference obtained by subtracting the thickness (2.0 mm) of the metal plate from the height of the cut edge face was taken as the height of the dross. As a measuring instrument, the dial gauge with a minimum scale of 0.01 mm, which is described in JIS B7503 (1997), was used. The measurement was performed at 10 points at 10 mm intervals and the average was obtained. The results are shown in Table 1.

In addition, the surface protection sheet for laser processing obtained in Example 5 was applied to one surface of a workpiece, and SPV-M-4002E (manufactured by NITTO DENKO CORPORATION) was applied to the other surface of the workpiece, and the obtained sample was used as Example 6. In Example 6, a cutting process test was performed by irradiating a laser beam to the surface applied with M-4002E, under the aforementioned conditions.

A workpiece subjected to a laser cutting processing without applying a surface protection sheet was used as Comparative Example 6.

TABLE 1

|  | melt viscosity (Pa·s) | thickness (mm) of substrate layer | height (mm) of dross |
| --- | --- | --- | --- |
| Example 1 | 74 | 0.038 | 0.2 |
| Example 2 | 26 | 0.04 | 0.3 |
| Example 3 | 74 | 0.05 | 0.3 |
| Example 4 | 47 | 0.05 | 0.5 |
| Example 5 | 74 | 0.038 | 0.2 |
| Example 6 | 74 | 0.038 | 0.3 |
| Comparative Example 1 | 285 | 0.11 | 1.6 |
| Comparative Example 2 | 285 | 0.06 | 1.3 |
| Comparative Example 3 | 74 | 0.125 | 0.8 |
| Comparative Example 4 | 422 | 0.04 | 1.2 |
| Comparative Example 5 | 295 | 0.04 | 1.0 |
| Comparative Example 6 | without application of surface protection sheet | | 0.2 |

As shown in Table 1, it has been clarified that the surface protection sheet for laser processing of each Example can reduce the height of a dross to the same level as the example without application of a surface protection sheet.

This application is based on a patent application No. 2005-187216 filed in Japan, the contents of which are incorporated in full herein by this reference.

The invention claimed is:

1. A method for preventing development of a dross on a surface opposite to a laser beam irradiation face of a stainless steel plate during a laser cutting process, comprising: providing a stainless steel plate having a surface protection sheet adhered to a surface of the stainless steel plate on an opposite side of a face of the stainless steel plate to be subjected to a laser beam irradiation, which sheet comprises a substrate layer and an adhesive layer formed on one surface of the substrate layer, wherein the substrate layer is made of at least one resin material selected from the group consisting of poly(ethylene terephthalate) and low density polyethylene, wherein the resin material has a melt viscosity measurement based on JIS K7199 (1999) at 290° C. of 20-100 Pa·s, wherein the substrate layer has a thickness of 0.02-0.05 mm, and cutting by irradiation process of a laser beam from a carbon dioxide gas laser on the stainless steel plate while blowing 0.5-1.5 MPa assist gas, wherein the surface protection layer sheet together with the stainless steel plate are cut during the cutting process, and wherein a height of the dross is suppressed to 0.5 mm or less.

* * * * *